CONVENTIONAL SINGLE CANCELLATION MTI UNIT

CONVENTIONAL TRIGGER PULSE GENERATOR FOR MTI

May 19, 1964 F. R. DICKEY, JR 3,134,101
MOVING TARGET INDICATOR
Filed March 2, 1960 2 Sheets-Sheet 2

INVENTOR,
FRANK R. DICKEY, JR.
BY Harry M. Saragovitz
ATTORNEY.

United States Patent Office 3,134,101
Patented May 19, 1964

3,134,101
MOVING TARGET INDICATOR
Frank R. Dickey, Jr., 112 Cornwall Drive, De Witt, N.Y., assignor to the United States of America as represented by the Secretary of the Army
Filed Mar. 2, 1960, Ser. No. 12,485
4 Claims. (Cl. 343—7.7)

This invention relates to moving target indicators and more specifically to improved circuit means for use with conventional moving target integrators.

Moving target indicators (M.T.I.) make use of the Doppler effect. The phase relationship existing at the radar receiver between the phase of the transmitted pulse and the phase of the resulting echo from a fixed target is the same for successive pulses. Inversely, since the distance to the moving target changes, the relative phase of the echo signals received from a moving target also continually changes with respect to the phase of the transmitted pulse. This variation in the relative phase between the sending pulse and its corresponding echo from a moving target, as contrasted with the constancy of the relative phase from an immovable target, provides a means of distinguishing between stationary and moving targets.

One difficulty with M.T.I. is that targets at certain speeds produce signals or echoes the relative phase of which is constant, just as in the case of fixed targets. These velocities, called blind speeds, occur when the radial distance moved by the target between two successive pulses is an integral number of half wavelengths of the radiation emitted by the transmitter. The very undesirable consequence of the above phenomenon is that enemy targets moving at these blind speeds will pass undetected by the radar systems.

It is therefore the main object of this invention to provide additional means to existing M.T.I. systems to eliminate the blind speed effect.

This is accomplished by the provision of relatively simple circuitry and by the technique of alternating between different repetition periods.

The features of this invention which are believed to be novel are set forth with particularity in the appended claims. The present invention itself, together with further objects and advantages thereof, may best be understood by reference to the following description taken in connection with the accompanying drawings in which:

Figure 1:
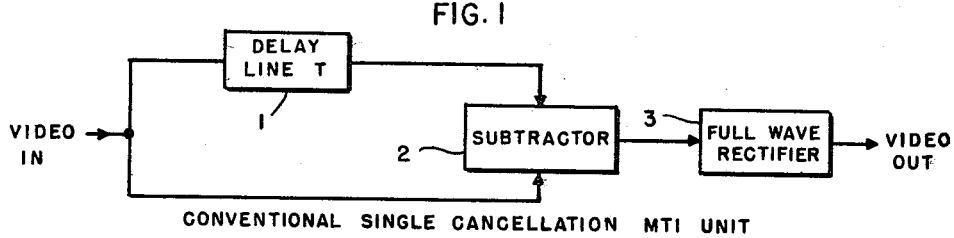
FIG. 1 is a schematic diagram of a conventional single cancellation M.T.I. unit.

FIG. 1 illustrates a conventional cancellation unit which attaches to a pulsed radar to provide moving-target indication. The delay line 1 introduces a delay T equal to the repetition period of the radar so that when two successive echoes from the same target are of equal amplitude they are cancelled by the subtractor 2. The video voltage entering the unit consists of pulses from fixed targets and of pulses from moving targets. The Doppler effect is utilized in the radar to make the pulses from moving targets vary rapidly in amplitude. Because of this variation the moving-target signals, in general, are not removed by the subtraction process while the fixed targets are removed. The output signal from subtractor 2 is rectified by the full wave rectifier 3 and is indicative of the presence of a moving target. For a more efficient cancellation of echoes derived from fixed targets, two or more cancellation units may be connected in series.

Figure 2:
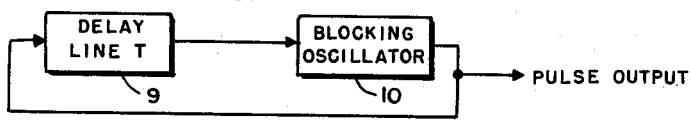
FIG. 2 is a schematic diagram of a conventional trigger pulse generator for the M.T.I. unit of FIG. 1.

With either a single or a double cancellation unit, the delay time T of delay line 1 must be exactly equal to the pulse repetition period. This is accomplished in practice by generating the trigger pulses which fire the radar transmitter by means of a pulse generator which is automatically adjusted so that the pulse intervals match the period of the delay line 1. For example, a common type of pulse generator whose period is controlled by a delay line is shown in FIG. 2. Here a blocking oscillator 10 generates a pulse which goes through a delay line 9 to refire the blocking oscillator which then produces a second pulse and repeats the process. The waveform at the output of the blocking oscillator 10 consists of a train of pulses separated in time by the time delay T of delay line 9.

The conventional trigger pulse generator of FIG. 2 and the conventional cancellation unit of FIG. 1 may be adequate to detect a target not travelling at a blind speed. However, under the blind speed condition successive pulses from a moving target are identical and, therefore, are cancelled by subtractor 2 of FIGURE 1.

But, if the time intervals between successive pulses are varied, then the blind speed condition will not occur; that is, the speed of the target may be such that the first and second pulses, for example, will cancel but then the second and third will not cancel, and so on. The present invention consists of a technique for alternating between two different repetition periods which is relatively easy to accomplish.

Figure 3:
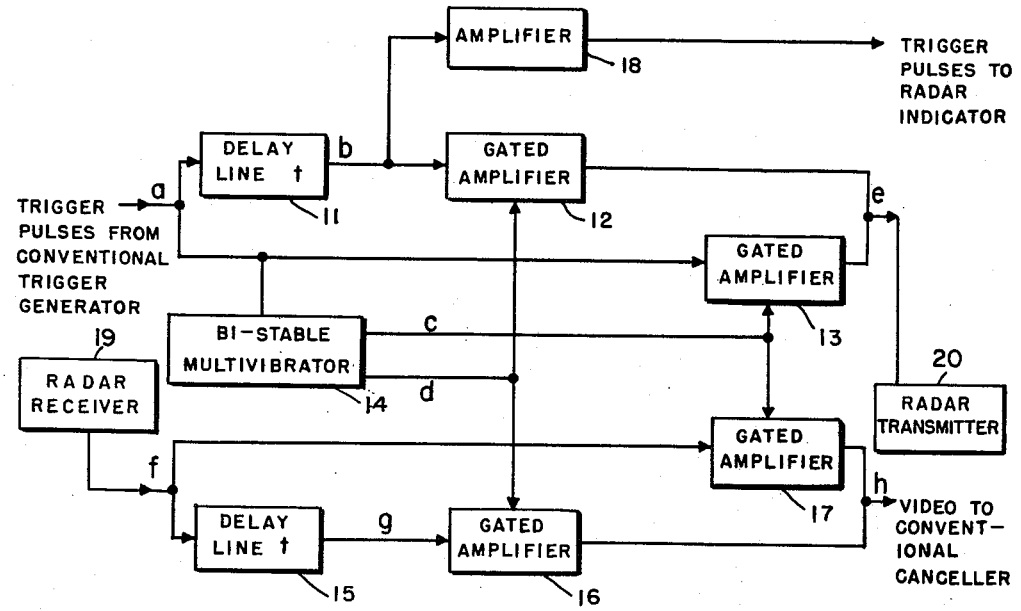
FIG. 3 is a block diagram of a circuit in accordance with this invention for removing the effects resulting from blind speeds in the M.T.I. unit of FIG. 1.

An embodiment of the present invention is shown in block diagram form in FIG. 3. Two functions are performed thereby: one on the trigger pulses generated by the conventional method and which fire the radar transmitter 20, and the other on the video signals before they are supplied to the conventional M.T.I. delay line canceller of the type shown in FIG. 1.

The equally time-spaced trigger pulses from the pulse generator of FIG. 2 enter the unit of FIG. 3 on lead (a). They pass through a delay line 11 of time delay t which is smaller than the repetition period T used by the canceller. A criterion for selecting t will be given below.

Figure 4:
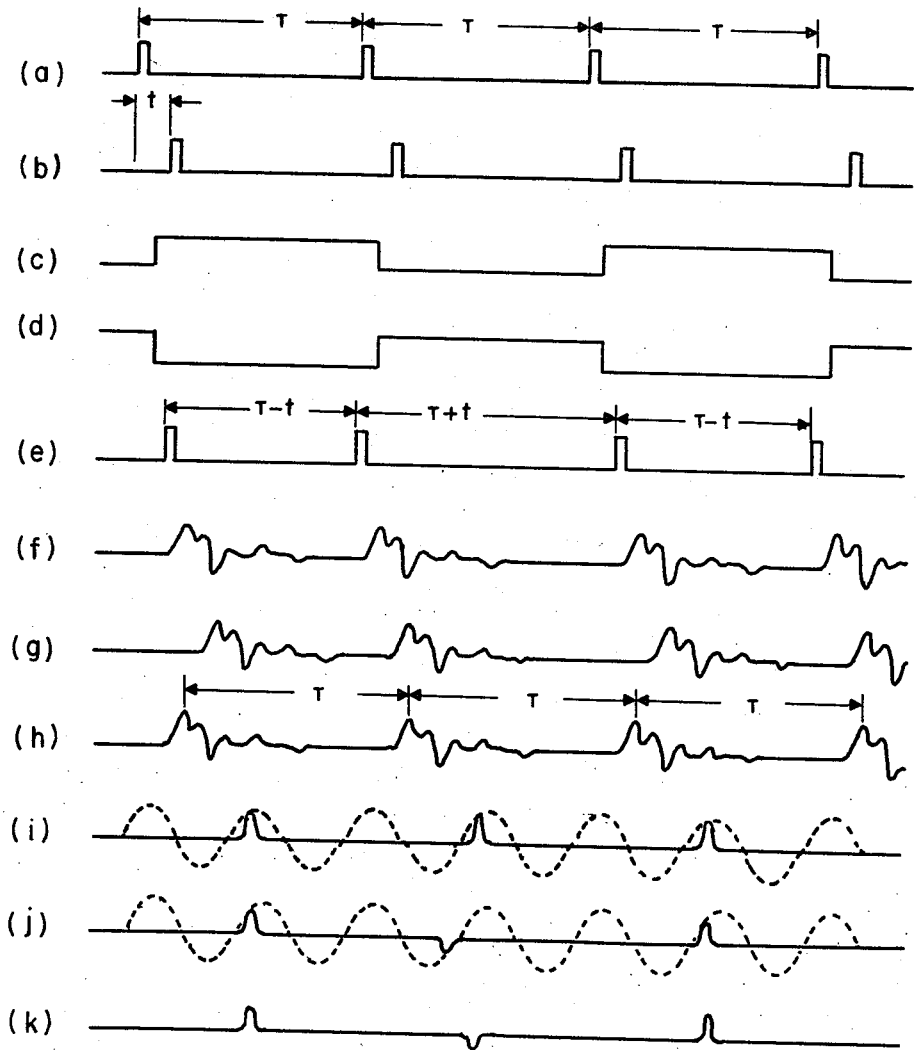
FIG. 4 shows various waveforms at different points in the system of FIG. 3.

Two amplifiers 12 and 13 are gated on and off by means of voltages from a bi-stable multivibrator or flip-flop circuit 14. The waveforms at different points of the system of FIG. 3 are shown in FIG. 4. At line (a), the trigger pulses from the conventional trigger generator of FIG. 2 have a constant repetition period T. These trigger pulses arrive at (b) after a time delay t. The bi-stable multivibrator circuit 14 of FIG. 3 is triggered by the incoming pulses from (a). As indicated in sketches (c) and (d) of FIG. 4, the change of state in the bi-stable multivibrator is assumed to occur coincidentally with or immediately following the trailing edge of each trigger pulse. The effect of the delaying action by delay line 11, and of the gating action by amplifiers 12 and 13, is to change the intervals between successive pulses such that their intervals alternate between two values: $T-t$ and $T+t$. The output trigger pulses at (e) consist, therefore, of one delayed pulse from (b) and one undelayed pulse from (a) and so on. See line (e), FIG. 4.

The unequally spaced pulses from line (e) are used to fire radar transmitter 20 and, hence, received echoes from a target are also spaced at the same unequal intervals. For a typical situation in which signals from a number of fixed targets are being received the radar video signal might appear as on line (f) of FIG. 4. This video voltage from the radar receiver 19 is applied via lead (f) to a second delay line 15 having the same value of time delay t as delay line 11. Here again two amplifiers 16 and 17 similar to amplifiers 12 and 13, and gated by 14, select first the delayed and then the undelayed video voltages. The output video voltage appearing on lead (h) now has the constant period T required for cancellation to take place when it is subsequently applied to a conventional canceller, such as shown in FIG. 1.

The video waveforms shown at lines (f), (g) and (h) represent signals from fixed targets which are to be removed by the canceller. In order to show now how blind speeds are removed it is necessary to consider a moving target.

FIGURE 4, line (i) represents a typical signal from a moving target under a blind speed condition. Here the dotted line shows the signal amplitude which would have existed had the signal occurred at any given time. The signal amplitude tends to vary sinusoidally because of the Doppler effect. Under the blind speed condition, unfortunately, there are exactly two Doppler cycles per repetition period so that no variation in the signal amplitude actually occurs.

Line (j) shows the same condition for pulses occurring at unequal intervals, that is, with the transmitter 20 being fired now with pulses from lead (e) instead of from lead (a). Waveform (j) will now appear on lead (f) and under these conditions waveform (k) would then appear on lead (h). In contrast with the waveform shown on line (i), these pulses will no longer be removed by the canceller of FIG. 1, and hence the blind speed condition will be corrected.

In FIG. 3, trigger pulses for the radar indicator are obtained from lead (b) through an amplifier 18. Examination of the waveforms shows that all the video signals appearing on lead (h) are delayed by the amount $t$ from the time they would occur if the blind speed removing device were not used. Hence to provide the correct reference for measuring echo time or range, the trigger pulses applied to the indicator must also be delayed by the same amount $t$.

In the embodiment shown in FIGURE 3, it is possible to use a single delay line instead of the two delay lines 11 and 15. This can be done by time sharing the one delay line through the use of signal gates or electronic switches. It can also be done by frequency multiplexing the single delay line, or by other well-known multiplexing techniques.

The velocity response of an M.T.I. system using the device of the present invention may be computed by first calculating the response that the conventional system would have if its period were $T+t$ and then calculating the response that it would have if its period were $T-t$. The response of the staggered repetition period system is then obtained by calculating the R.M.S. sum of the two responses at each value of velocity. Typical curves, plotted as a function of Doppler frequency, tend to be the smoothest in the region where the Doppler frequency is equal to ¼ $t$. The delay time $t$, therefore, may be chosen so that this region is in the velocity range of most interest. The period staggering technique of the present invention may also be applied to other types of cancellers, for example, to those with feed-back.

What is claimed is:

1. A moving target indicator system comprising: a transmitter for sending out a series of pulses; a receiver for receiving echoes of said series of pulses; a trigger pulse generator; a first channel comprising a delay-line and a first gated amplifier connected in series; a second channel comprising a second gated amplifier connected in parallel with said first channel; means to couple said trigger generator to said delay-line and to said second gated amplifier; a bistable multivibrator having an input coupled to said trigger generator; a first output coupled to said first gated amplifier and a second output coupled to said second gated amplifier; and means to couple said first and second gated amplifiers to said transmitter.

2. A device for varying the output pulse repetition rate of a radar transmitter, said device comprising: a trigger pulse generator; a first channel having a delay line and a first gated amplifier connected in series; a second channel having a second gated amplifier connected in parallel with said first channel; means to couple said generator to said delay line and to said second gated amplifier; means coupled to said generator and to said first and second gated amplifiers for alternately gating said first and second gated amplifiers; and means to couple said first and second gated amplifiers to said transmitter.

3. A moving target indicator system comprising: a transmitter for sending out a series of pulses; a receiver for receiving echoes resulting from said series of pulses striking fixed or moving objects; a trigger pulse generator; a first channel comprising a first delay line and a first gated amplifier connected in series; a second channel comprising a second gated amplifier connected in parallel with said first channel; means to couple said trigger generator to said first delay line and to said second gated amplifier; a flip-flop circuit having an input coupled to said trigger generator, a first output coupled to said first gated amplifier; and a second output coupled to said second gated amplifier; means to couple said first and second gated amplifiers to said transmitter; a third channel comprising a third gated amplifier and a second delay line connected in series; a fourth channel comprising a fourth gated amplifier connected in parallel with said third channel; means to couple the output of said receiver to said second delay line and to said fourth gated amplifier; means to couple said first flip-flop output to said third gated amplifier; and means to couple said second flip-flop output to said fourth gated amplifier.

4. A moving target indicator system comprising: a transmitter for sending a series of pulses; a receiver for receiving echoes resulting from said series of pulses striking fixed and moving objects; a canceller circuit for cancelling echo pulses from fixed targets; a trigger generator; a first channel comprising a first delay line and a first gated amplifier connected in series; a second channel comprising a second gated amplifier connected in parallel with said first channel; means to couple said trigger generator to said first delay line and to said second gated amplifier; a bistable multivibrator having an input coupled to said trigger generator, a first output coupled to said first gated amplifier, and a second output coupled to said second gated amplifier; means to couple said first and second gated amplifiers to said transmitter; a third channel comprising a third gated amplifier and a second delay line connected in series; a fourth channel comprising a fourth gated amplifier connected in parallel with said third channel; means to couple the output of said receiver to said second delay line and to said fourth gated amplifier; means to couple the output of said receiver to said second delay line and to said fourth gated amplifier; means to couple said first multivibrator output to said third gated amplifier; means to couple said second multivibrator output to said fourth gated amplifier; and means to couple said third and fourth gated amplifiers to said canceller circuit.

References Cited in the file of this patent

UNITED STATES PATENTS

| | | |
|---|---|---|
| 2,646,561 | Emslie | July 21, 1953 |
| 2,746,033 | Bachmann | May 15, 1956 |
| 2,765,446 | Martin | Oct. 2, 1956 |